(12) United States Patent
Bryant et al.

(10) Patent No.: US 8,923,141 B2
(45) Date of Patent: Dec. 30, 2014

(54) PROVIDING CLOCK SYNCHRONIZATION IN A NETWORK

(75) Inventors: Stewart Frederick Bryant, Redhill (GB); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 2042 days.

(21) Appl. No.: 11/725,156

(22) Filed: Mar. 16, 2007

(65) Prior Publication Data

US 2008/0225897 A1 Sep. 18, 2008

(51) Int. Cl.
*H04J 3/14* (2006.01)
*H04J 3/06* (2006.01)

(52) U.S. Cl.
CPC ............ *H04J 3/0679* (2013.01); *H04J 3/0632* (2013.01)
USPC .......................................... 370/252; 370/516

(58) Field of Classification Search
CPC .............................. H04J 3/0632; H04J 3/0679
See application file for complete search history.

(56) References Cited

U.S. PATENT DOCUMENTS

| | | | | |
|---|---|---|---|---|
| 4,569,042 A * | 2/1986 | Larson | | 370/250 |
| 6,360,271 B1 * | 3/2002 | Schuster et al. | | 370/516 |
| 6,366,563 B1 * | 4/2002 | Weldon et al. | | 370/252 |
| 6,512,761 B1 * | 1/2003 | Schuster et al. | | 370/352 |
| 7,088,718 B1 * | 8/2006 | Srivastava | | 370/392 |
| 7,362,707 B2 * | 4/2008 | MeLampy et al. | | 370/235 |
| 7,415,044 B2 * | 8/2008 | Kallstenius | | 370/516 |
| 7,453,882 B2 * | 11/2008 | Ho et al. | | 370/395.1 |
| 7,693,062 B2 * | 4/2010 | Perkins et al. | | 370/235 |
| 2003/0072269 A1 * | 4/2003 | Teruhi et al. | | 370/252 |
| 2003/0133443 A1 * | 7/2003 | Klinker et al. | | 370/353 |
| 2004/0025018 A1 * | 2/2004 | Haas et al. | | 713/168 |
| 2005/0094619 A1 * | 5/2005 | Ho et al. | | 370/351 |
| 2005/0254428 A1 * | 11/2005 | Perkins et al. | | 370/235 |
| 2006/0256803 A1 * | 11/2006 | Nakata et al. | | 370/412 |
| 2007/0133469 A1 * | 6/2007 | Shin et al. | | 370/331 |
| 2007/0220133 A1 | 9/2007 | Park | | |
| 2008/0144511 A1 * | 6/2008 | Marcondes et al. | | 370/236 |

OTHER PUBLICATIONS

Mills, "Network Time Protocol (Version 3) Specification, Implementation and Analysis," Internet Engineering Task Force Network Working Group Request for Comments (RFC) 1305, Mar. 1992, 102 pages.
Mills, "Network Time Protocol (NTP)," IETF RFC 958, Sep. 1985, 15 pages.
Mills, "Algorithms for Synchronizing Network Clocks," IETF RFC 956, Sep. 1985, 27 pages.
Mills, "DCN Local-Network Protocols," IETF RFC 891, Dec. 1983, 28 pages.
Mils, "DCNET Internet Clock Service," IETF RFC 778, Apr. 19, 1981, 5 pages.
Mills, "Network Time Protocol Version 4 Reference and Implementation Guide," NTP Working Group Technical Report 06-6-1, University of Delaware, Jun. 2006.

* cited by examiner

*Primary Examiner* — Steven H Nguyen
(74) *Attorney, Agent, or Firm* — Hickman Palermo Truong Becker Bingham Wong LLP

(57) ABSTRACT

In one embodiment, an apparatus for providing clock synchronization in a packet-based network, the network having as components nodes and links therebetween and having a network topology, is arranged to compute a forward clock synchronization packet path to a synchronization destination from the network topology according to a computation rule such that the return path for a clock synchronization packet from the synchronization destination is the same as the forward path.

22 Claims, 6 Drawing Sheets

PROVIDING CLOCK SYNCHRONIZATION IN A NETWORK

TECHNICAL FIELD

The present disclosure generally relates to data communications networks. The disclosure relates more specifically to techniques for providing clock synchronization in networks.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One such protocol is the link state protocol which relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. In some instances two paths have equal cost, termed an equal cost multi-path (ECMP) or path split. In those circumstances the node will forward down one or the other path dependent on some predetermined rule, for example to achieve load balancing between the paths. When there is a network topology change an LSP representing the change is flooded through the network by each node adjacent the change, each node receiving the LSP sending it to each adjacent node. The nodes each recomputed their SPF based on the changed topology and "converge" on the new topology.

The Network Time Protocol (NTP) is used to synchronize the clocks of computer systems over packet-switched, variable-latency data networks. Internet services often rely on accurate computer clocks, for example, when receiving a request to send a file modified after a certain time. For the purposes of maintaining consistent time-stamping, there is the requirement that computers sharing files from the same file server utilize synchronized clocks.

NTP employs a hierarchy of servers each with a designated stratum level. The stratum level defines the distance from and accuracy of the reference clock, a lower level being more favorable. NTP enables each server to synchronize to Universal Coordinated Time (UTC) using the most accurate source and shortest path to that source. It is preferable to have access to several sources of lower stratum time in order to detect error from any of the sources. Ordinarily, when the NTP servers are in agreement, NTP will choose the source with the combination of lowest stratum and transmission delay and highest claimed precision.

Currently, service providers are increasingly required to provide a much higher precision clock to some of their customers. NTP was designed on the basis that it was unable to influence the network between the clock source and the clock user. Where the service provider owns both the clock source and the delivery network, a solution may be deployed that utilizes the network to enhance delivery of the clock.

There are two particular problems that all clock over packet transfer protocols face. A first issue is path reciprocity—without path reciprocity it is impossible to do true clock synchronization. Ideally, Time at node A, Ta=Time at node B, Tb. When A pings B (or vice versa), it is assumed that where Transmission delay from A to B=Delay_ab and Transmission delay from B to A=Delay_ba that Delay_ab=(Delay_ab+Delay_ba)/2, and Tb is set to Ta+Delay_ab accordingly. In other words to synchronize clocks taking into account the path delay it is assumed that the delay is the same in both directions. In fact in time transfer systems, it is necessary to correct for path delay between the server and the client as $T_{actual}=T_{msg}+T_{transmission}$.

There is no way to measure $T_{transmission}$ directly as $T_{actual}$ would need to be known at both the server and the client. The simple approximation of $T_{transmission}=T_{roundtrip}/2$ (as discussed above) is not suitable as the forward and return paths may not be symmetric between the server and the client. This may be as a result of using asymmetric costs when generating the network topology or because Equal Cost Multi-Path (ECMP) paths exist where the flows are not reciprocal (forward path≠return path).

A second issue is clock phase transients as a result of network transients. For example where the network topology changes (i.e. a clock synchronization path fails), there will be a constant offset in the delivery time and no 'normal' delay packets will be delivered until the network re-converges on the changed topology. During this time, the client is said to be in holdover (it has no NTP synchronized clock source) and must run on its own local oscillator.

These problems are both addressable with assistance at the routing layer. Similar problems exist with other packet timing protocols such as IEEE 1588.

In order to provide a high quality clock service, a client needs to groom the incoming packet stream to determine whether the packet has been delayed en route. A delayed packet should not be used to operate the clock servo as this will introduce errors.

Therefore, there follows a need to provide router assistance for enhancing and safeguarding the delivery of the clock synchronization packets to clients, and providing an enhanced degree of immunity of the network timing paths to network topology changes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method are described for providing clock synchronization in a packet-based network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Apparatus and method for providing clock synchronization in a packet-based network having a network topology
4.0 Implementation Mechanisms—Hardware Overview
5.0 Extensions and Alternatives 1.0 General Overview In one embodiment, an apparatus for providing clock synchronization in a packet-based network having a network topology is provided. The apparatus is arranged to compute, from the network topology, a forward clock synchronization packet path to a synchronization destination according to a computation rule such that the return path for a clock synchronization packet from the synchronization destination is the same as the forward path Other embodiments provide a method, computer apparatus and a computer-readable medium configured to carry out the foregoing steps.

2.0 Structural and Functional Overview

Figure 1:
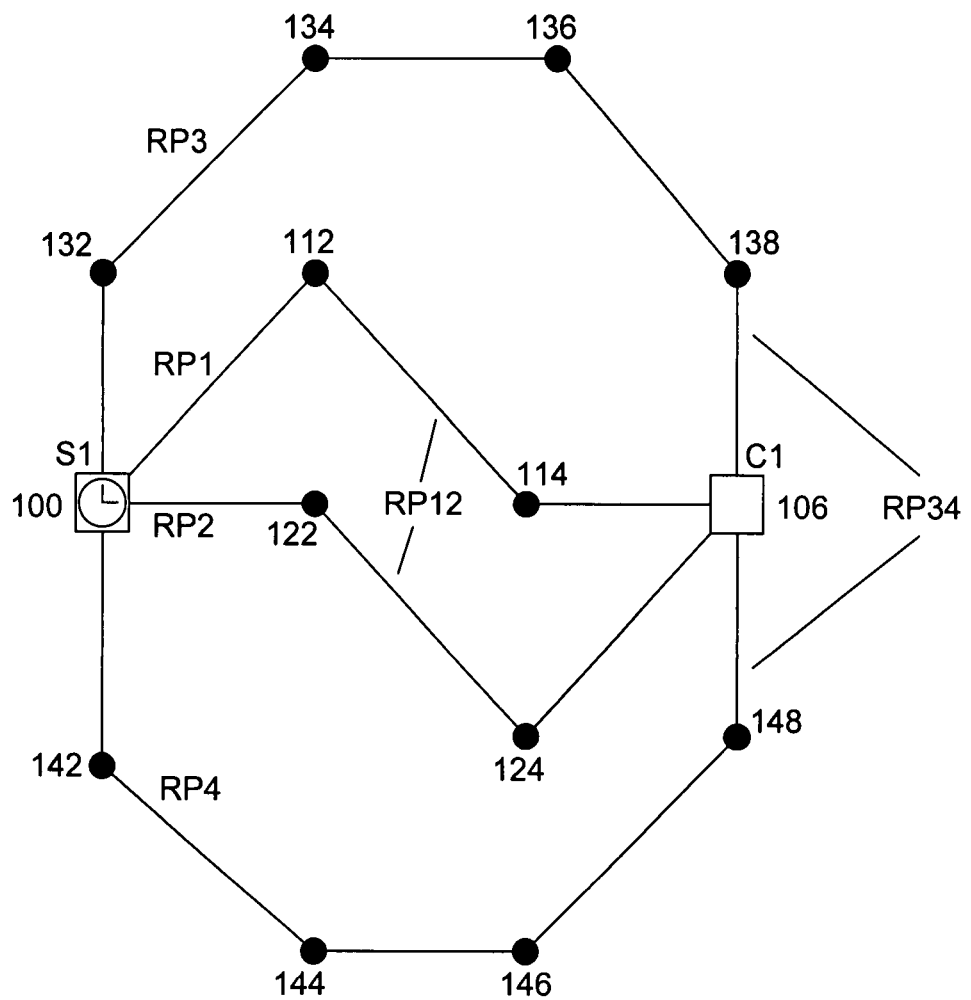
FIG. 1 illustrates an example network with which the approach can be implemented.
Figure 2:
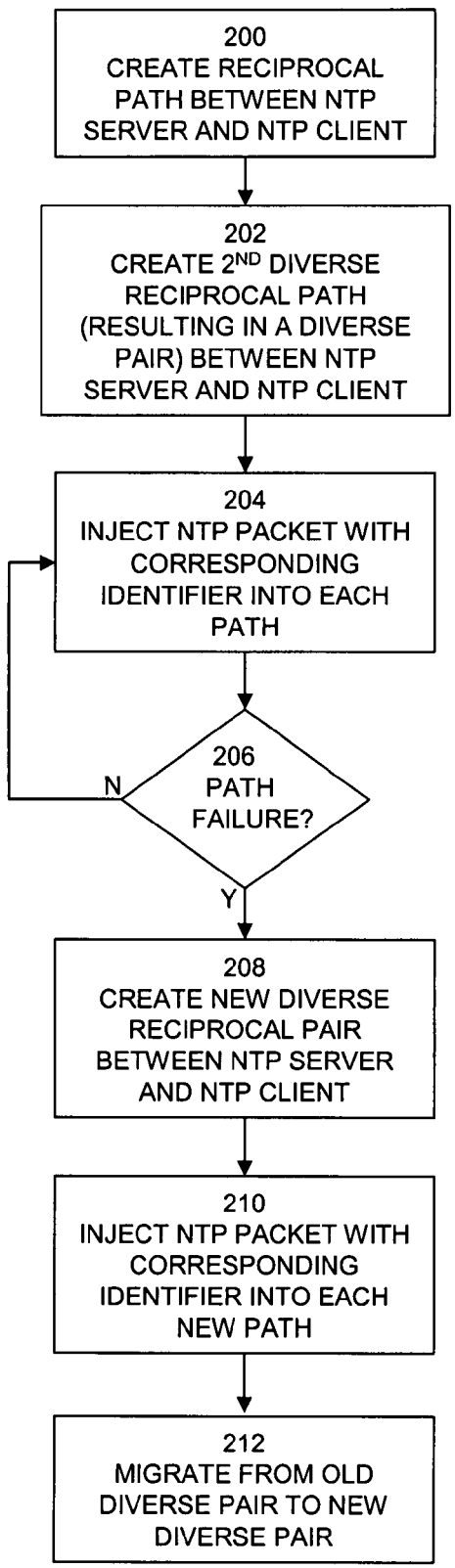
FIG. 2 is a flow diagram illustrating at a high level steps involved in implementing the approach.

In overview an apparatus and method for providing clock synchronization in a packet-based network having a network topology according to the approach described herein can be understood with reference to FIG. 1 which is a network diagram illustrating a network in relation to which the approach can be implemented and FIG. 2 which is a flow diagram illustrating at a high level the steps involved in implementing the approach.

The network shown in FIG. 1 includes NTP server S1 (reference numeral 100), NTP client C1 (reference numeral 106) and various network nodes arranged in two diverse reciprocal pairs of paths between N1 and C1. Diverse reciprocal paths RP1, (reference numerals 100-112-114-106) and RP2 (reference numerals 100-122-124-106) form a first diverse reciprocal pair RP12 and diverse reciprocal paths RP3 (reference numerals 100-132-134-136-138-106) and RP4 (reference numerals 100-142-144-146-148-106) form a second diverse reciprocal pair RP34. Each reciprocal path provides a forward and return clock synchronization packet path which is the same, i.e. shares exactly the same nodes and links but in reverse order. A round-trip clock synchronization packet path therefore comprises the forward and return path between the server and client. Each diverse pair provides a pair of paths being diverse, that is, computed according to a computation rule such that no node or link (except the server client end points) resides within both paths. Preferably, the paths in any one reciprocal pair are approximately the same length to minimize the buffering requirement.

It will be appreciated that the network configuration and connectivity may be of any appropriate type and a simple topology is provided in FIG. 1 for the purposes of clarity of explanation and that there may be multiple clock servers and/or clients. One of the NTP server and client can comprise an apparatus for computing a forward clock synchronization packet path to the other acting as synchronization destination. One of the NTP server and client may for example comprise an apparatus for computing a forward SPF to obtain a forward clock synchronization packet path to the other acting as synchronization destination and a forward SPF rooted at the synchronization destination to obtain a return clock synchronization packet path to it.

From the set of available time-servers, one is selected as the root (for example by choosing the one with the combination of lowest stratum, lowest transmission delay and highest claimed precision). At first, reciprocal path RP1 is created at step 200 ensuring that clock synchronization packets have a common forward and return path hence ensuring that any path delay is symmetric. In order to provide reliable clock synchronization via redundancy, a second diverse path is created at step 202, a diverse reciprocal pair of paths, RP12 hence being created between the chosen NTP server and each NTP client at steps 200 and 202. At step 204, an NTP packet with timing information is injected into each reciprocal path, RP1 and RP2 of diverse pair, RP12 by NTP server, S1. Each NTP packet contains identifying information for indicating which reciprocal path of the diverse pair it will use. As a result the packet is "locked in" to the relevant path.

While the network topology remains constant (the paths in a pair remain failure free), NTP client, C1 receives and returns a stream of NTP synchronizing packets from both branches of diverse reciprocal pair RP12 and hence has redundancy in case of failure. As the paths of RP12 are diverse, any single failure will only halt the stream of packets over one of the paths, RP1 or RP2. At step 206, upon a failure of one of the diverse reciprocal paths of RP12, for example, between nodes 112 and 114 of path RP1, the clock servo in NTP client, C1 will continue receiving synchronizing NTP packets locked into path RP2 without going into holdover.

The network, may proceed in one of two ways, it can continue to use the existing working path in anticipation that the broken link will be restored in a reasonable time, or it can transition the network (this decision process is orthogonal to the normal network transition for data packets which should continue as normal). Assuming the latter, and as it cannot be guaranteed that the remaining reciprocal path, RP2 is one of a further diverse pair, at step 208, a new diverse reciprocal pair, RP34 consisting of reciprocal paths RP3 and RP4 diverse with one another is provisioned by the network, taking into account the failure that has occurred. RP3 and RP4 may or may not be diverse with respect to the existing pair RP1 and RP2. The NTP client and server now run three instances of NTP over the original unbroken path, RP2 and the new diverse reciprocal pair of paths, RP34 at step 210, each path requiring a unique packet identifier only used on the corresponding path. The NTP instances running over the two new paths are used to calculate the new path lengths.

Once the new paths are calibrated, the old unbroken path, RP2 may be removed at step 212 and the new diverse reciprocal pair, RP34, provides the same level of redundancy in the clock synchronization connection between NTP server, S1 and client, C1 as before the network failure occurred.

It will be appreciated that by employing the above method, and removing clock phase transients as a result of network transients i.e. utilizing diverse reciprocal pairs of paths to provide redundancy in case of failure, the holdover time is reduced and a cheaper oscillator may be used at the client. Of course the method may provide a simple reciprocal path or diverse non-reciprocal paths or dual diverse pairs in a non-synchronization context and still provide improvement over known approaches.

3.0 Providing Clock Synchronization in a Packet-Based Network

Figure 3:
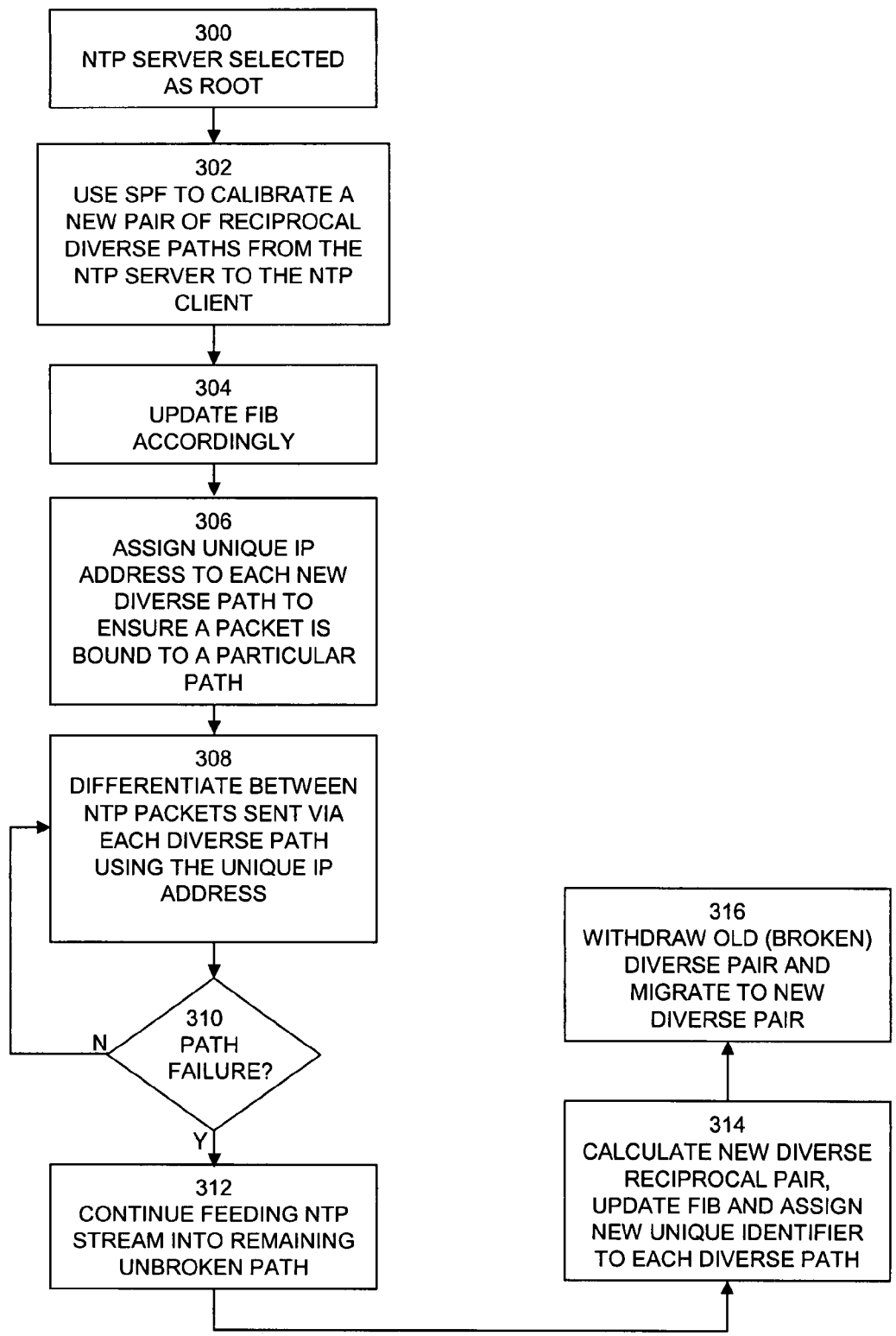
FIG. 3 is a flow diagram of the steps performed at an NTP server.
Figure 4:
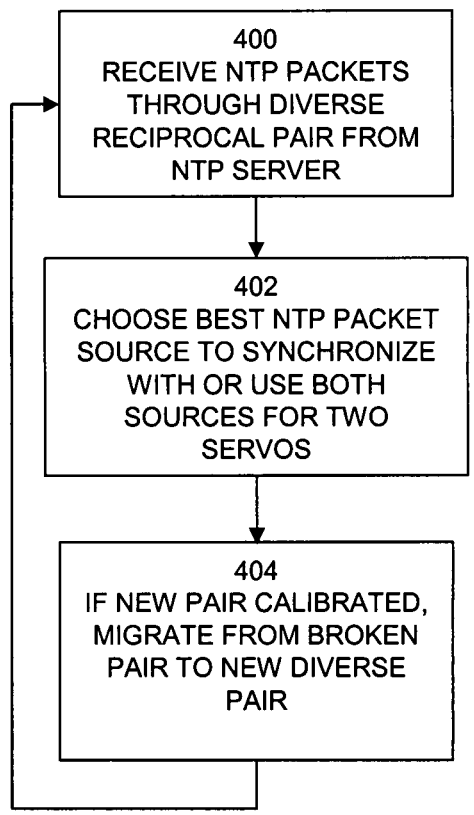
FIG. 4 is a flow diagram of the steps performed at an NTP client.
Figure 5:
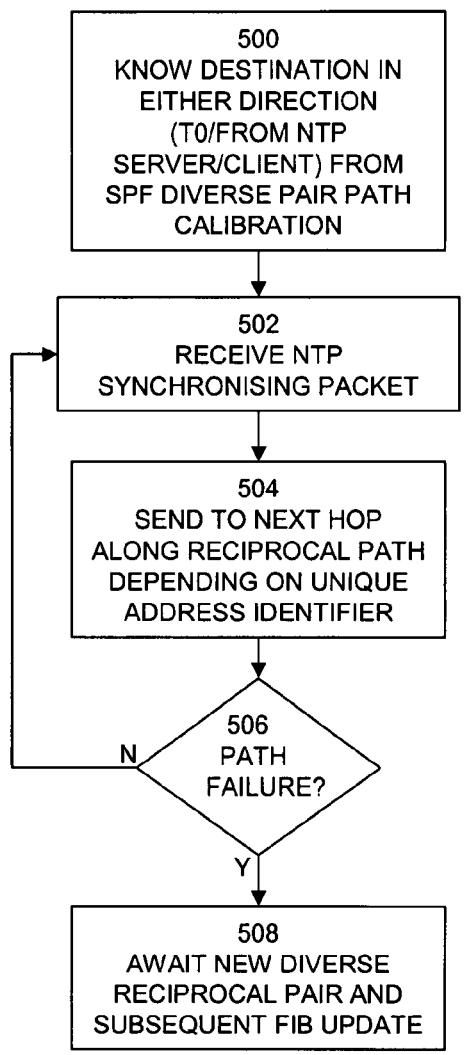
FIG. 5 is a flow diagram showing the steps performed at a network node along a reciprocal path between an NTP server and an NTP client.

Reference is made to FIG. 3 which is a flow diagram of the steps performed at an NTP clock server such as S1, FIG. 4 which is a flow diagram of the steps performed at an NTP client such as C1 and FIG. 5 which is a flow diagram showing the steps performed at a network node along a reciprocal path between an NTP server and an NTP client.

Referring firstly to FIG. 3, at step 300, an NTP server, S1, of FIG. 1 is chosen as the root for a particular client-server relationship. At step 302, based on the LSDB, a pair of diverse reciprocal paths is constructed to an NTP client from the NTP server.

Construction of a first reciprocal path, RP1 between the NTP server and an NTP client, and a second diverse reciprocal path, RP2 provides redundancy in case of failure along the first reciprocal path. These reciprocal paths are used solely to provide a time service path. It will be seen that the diverse paths may not be the shortest path, but as special identifiers are used to carry the time service traffic (see step 306), allowing special forwarding entries for these packets, they may be routed over diverse paths calculated using any known diversity algorithm. For example, following the computation of the shortest path, the links providing the shortest path may be removed from the network topology. A subsequent SPF calculation would then render a further path, diverse from the first. However, if the network topology is such that removing the shortest path would make the desired connection impossible, other algorithms must be employed. One such known diversity algorithm calculates both paths simultaneously and calculates the shortest path and sets the costs along the shortest path as minus the backwards costs with all forward costs set to infinity. The resulting shortest path and calculated next shortest path are then merged to produce the two desired diverse paths. In one approach, the paths are selected so as to provide the closest matched delay available to avoid buffering of the earlier arrived packet at the client where both paths are utilized for synchronization. Yet a further alternative is to create tunnels corresponding to each path according to any appropriate approach.

Examples of known diversity algorithms may be found in Ramesh Bhandari—Survivable Networks: Algorithms for Diverse Routing [Kluwer Academic Pub (Jun. 1, 1999)], J. W. Suurballe—Disjoint paths in a network [Networks, vol. 4, pp. 125 {145, 1974 and J. W. Suurballe and R. E Tarjan—A quick method for finding shortest pairs of disjoint paths [Networks, vol. 14, pp. 325 {336, 1984]

Path reciprocity is achieved by running a special instance of the Shortest Path First (SPF) calculation with the property that path costs are treated as symmetric, for example always taking the lower or higher cost in the case of an asymmetric link having different costs in the forward and return direction, and by systematically selecting a single member from a path split set, for example by choosing the path corresponding to the lowest interface number or any other appropriate approach such that the path from A to B is always the path chosen from B to A and ECMP=1.

At step 304, the FIB is updated accordingly to reflect the diverse reciprocal pair of paths, RP12. Within a service provider network, dedicated addresses can be used for the timing service, i.e. for both the NTP server and the NTP client. These addresses can be mapped to a special network topology with constraints that do not apply to the rest of the network, for example, the diverse path sets used may not be the shortest, and therefore the topology may be different from the optimum data topology. Thus at step 306, special time service identifiers, for instance, but not limited to, IP addresses are assigned to each of the diverse reciprocal paths.

This approach results in the desired property of an NTP packet, once injected, being suitably identified at step 308 and hence bound to a particular diverse reciprocal path between the NTP server and an NTP client. In particular, the IP address may carry a semantic recognizable at each node as requiring forwarding according to the special FIB entry corresponding to this address, ensuring both lock-in to the diverse path (even if it is not the shortest) and forwarding along the reciprocal path (even if there are ECMPs).

At step 310, upon a network failure in one of the diverse reciprocal paths of a diverse pair, for example, RP1 between nodes 112 and 114, the remaining path of the diverse reciprocal pair, RP2 continues to be injected with NTP packets at step 312 in order to maintain the clock synchronization of the NTP server and client. The client and server become aware of the failure by monitoring for non-arrival of packets over one path or detecting the topology change from an LSP.

At step 314, the network executes a new SPF to calculate a new diverse reciprocal pair, RP34, updates the FIBs and assigns new unique identifiers. One of the new reciprocal paths, RP3 or RP4 may be congruent with non-failed parts of the failed path, RP1 or the remaining reciprocal path, RP2 for example by identifying whether a diverse path exists with RP2 and the failure removed from the topology or the pair may be computed afresh based on the entire network less the failure. At step 316, once calculated and in use, the timing servos can lock to NTP packets on the new diverse reciprocal pair, RP34. Once this has taken place, the broken diverse reciprocal pair, RP12 may be withdrawn.

It will be appreciated that as and when a further network failure occurs in one of the new diverse reciprocal paths, the two original identifiers, for instance, but not limited to IP addresses may be re-used to bind NTP packets to a further new diverse reciprocal pair calculated by the network. This scheme therefore requires a total of four NTP server and NTP client identifiers.

It will be noted that the specific form of the indicator can take any appropriate type such as setting of one or more appropriate bits, or any other appropriate coding recognizable by the network nodes, and is not limited to the use of IP addresses but may include techniques known from multi-topology routing or other forwarding paradigms.

Turning to the steps performed at an NTP client, for example C1, as shown in FIG. 4, at step 400, following the calibration at the NTP server of a first diverse reciprocal pair of paths, RP12, the client receives synchronizing NTP packets from both paths and, at step 402, may choose to synchronize with the best quality stream available and run one timing servo, or run two timing servos individually synchronized to the two NTP streams from the two reciprocal paths of the diverse pair, RP12. The client recognizes the IP address semantic of the incoming synchronized packets or otherwise identifies that the incoming path is a synchronization packet path and sends return packets along the same path. Upon a failure in one of the reciprocal paths, for example RP1 in between nodes 112 and 114, synchronization is still possible via the unbroken path. While maintaining synchronization, as discussed above, a new diverse reciprocal pair, RP34 is calculated at the NTP server and once calculated, the NTP packet stream in the new diverse pair, RP34 is locked on to allowing the broken pair, RP12 to be withdrawn at step 404. In particular, the client server may recognize the IP address or other semantic on incoming packets as the new pair and return the packets accordingly. The best NTP source may be chosen from the redundancy provided by the new diverse pair.

Referring to the steps performed at a network node, for example node 114 of FIG. 1, on a reciprocal path in between an NTP server, S1 and an NTP client, C1, at step 500, from its FIB, the node knows the next hop for a synchronization packet on its particular path, RP1 between the NTP server and NTP client. When an NTP synchronizing packet is received at the node, at step 502, the identifying information is interrogated to determine the actual next hop it should be sent to at step 504 (in this example this is either node 112 or node 106, the client). Again, the node may recognize the IP address or other semantic on incoming packets forward the packet accordingly. Upon a failure in the path, for example in between nodes 112 and 114, the NTP stream will cease and only resume when a new diverse pair is established between the originating NTP server and the destination NTP client. Until this time, the stream remains stalled. The node in question will only resume passing of NTP packets if it resides on one of the reciprocal paths of the new diverse pair calculated by the network in response to the failure which it is informed of when its FIB is subsequently updated.

It will be appreciated from the above that two fully diverse paths are required to connect any NTP client to any NTP server and provide redundancy. It is not necessary for any client to talk to any other client, nor for any server to talk to any other server. Therefore, a single spanning tree providing complete connectivity is not required. Two sets of diverse paths as described above are the necessary and sufficient requirement.

By concurrently running NTP timing over diverse reciprocal paths it is possible to ensure that the time service continues during network failure (reducing the number of times when the service needs to go into holdover). By ensuring that the paths are reciprocal, the path delay error due to asymmetry is minimized. This is achieved by running multiple concurrent network topologies for use by the timing service and providing suitable topology migration support.

The manner in which the path information is distributed amongst the nodes may be in any appropriate form. For example, each node may recognize a bit set in an IP packet and forward the packet in a preconfigured manner. Alternatively, a node may be preconfigured to recognize and appropriately forward packets with certain IP addresses and address formats, which addresses may be loaded statically or distributed dynamically by the node constructing the paths.

The approach can be implemented in any appropriate network or environment using any appropriate protocol. The manner in which the method described herein is implemented may be using software, firmware, hardware or any combination thereof and with any appropriate code changes as will be apparent to the skilled reader without the need for detailed description herein.

4.0 Implementation Mechanisms—Hardware Overview

Figure 6:
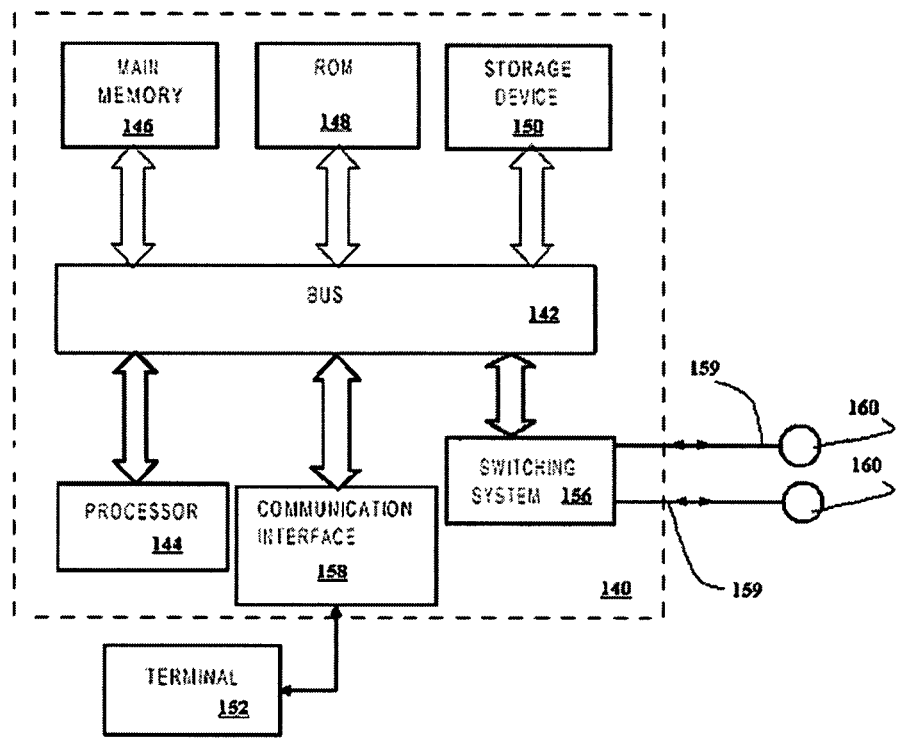
FIG. 6 is a block diagram that illustrates a computer system on which a method of providing clock synchronization may be implemented.

FIG. 6 is a block diagram that illustrates a computer system 140 upon which the method may be implemented. The method is implemented using one or more computer programs running on a network element such as a router device. Thus, in this embodiment, the computer system 140 is a router.

The computer system 140 implements the above described method of providing clock synchronization data. Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements the above described method of providing clock synchronization. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multiprocessing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), or routing vector protocols and any forwarding paradigm, for example MPLS. The method can be applied in any network of any topology and in relation to any component change in the network for example a link or node failure, or the introduction or removal of a network component by an administrator.

It will be appreciated that multiple servers and/or multiple clients, and hence multiple diverse spanning trees between all objects interested in time may be employed to facilitate the herein described method of providing clock synchronization. In a basic approach, a single instance of SPF is sufficient to implement the above described method between an NTP server and client. Alternatively, a diverse reciprocal triplet may initially be calculated in order to provide two redundant diverse reciprocal paths in case of a single failure (network configuration allowing) thus providing further redundancy in case of failure such that it is not necessary to compute a second diverse path upon failure of a component. To provide server diversity, more than one server may be employed in the network. A separate instance of the diverse reciprocal path topology with corresponding unique identifiers, for instance, but not limited to, IP addresses may be run between each server-client connection to provide redundancy against failure in any one of the diverse reciprocal pairs of connections. Any of the features of a reciprocal path, diverse pair or dual diverse pair may be implemented independently of the remaining features whilst retaining the benefits over known approaches. The computation, installation and/or advertisement of the synchronization paths can be performed by any appropriate mode including, for example, the NTP server or client.

Where reference is made to NTP, it will be appreciated that the approach can be applied in relation to any appropriate time information protocol. The routing domain may comprise an AS, SRLG, or LAN, or any other network of interconnected components sharing a common routing protocol.

What is claimed is:

1. An apparatus for providing clock synchronization in a packet-based network having as components nodes and links therebetween and having a network topology, wherein the apparatus comprises:
   one or more processors; and
   a network interface communicatively coupled to the one or more processors and configured to communicate one or more packet flows among the one or more processors in a network; and logic coupled to the one or more processors and when executed operable to compute, from the network topology, a reciprocal clock synchronization packet path from a server to a synchronization destination according to a computation rule such that a return path of the reciprocal clock synchronization packet path from the synchronization destination is the same as a forward path of the reciprocal clock synchronization packet path;

logic coupled to the one or more processors and when executed is operable to compute, from the network topology, a diverse reciprocal clock synchronization packet path, from the server to the synchronization destination, comprising a diverse forward path and a diverse return path, wherein no network component other than path end points is in both the reciprocal clock synchronization packet path and the diverse reciprocal clock synchronization packet path;

logic coupled to the one or more processors and when executed is operable to inject a first time synchronization packet into the reciprocal clock synchronization packet path; inject a second time synchronization packet into the diverse reciprocal clock synchronization packet path; synchronize time at the synchronization destination with time at the server based on the first time synchronization packet and the second time synchronization packet.

2. An apparatus according to claim 1 comprising at least one of a master or a client synchronization node and the synchronization destination comprising the other of at least one of a master or a client synchronization node.

3. An apparatus according to claim 1 arranged to compute, from the network topology, a forward clock synchronization packet path to the synchronization destination according to a link-state algorithm.

4. An apparatus according to claim 3 in which the computation rule comprises, for an asymmetric link, selecting a forward cost and a return cost, wherein the forward cost is equal to the return cost.

5. An apparatus according to claim 3 in which the computation rule comprises, for a path split, a consistent path selection rule.

6. An apparatus according to claim 3 in which the computation rule comprises computing at the apparatus the forward path and the return path rooted at the synchronization destination.

7. An apparatus as claimed in claim 1 further comprising logic which when executed is operable to forward on a packet path a synchronization packet including a path identifier.

8. An apparatus as claimed in claim 1 further comprising logic which when executed is operable to detect failure of a path component of one of roundtrip paths and compute at least one further diverse roundtrip path excluding the failed component.

9. An apparatus as claimed in claim 8 further comprising logic which when executed is operable to forward a synchronization packet on the at least one further diverse roundtrip path and withdraw the roundtrip path including the failed component.

10. An apparatus as claimed in claim 7 further comprising a node on a path arranged to receive a packet including said path identifier and forward said packet along the identified path.

11. An apparatus as claimed in claim 7 further comprising the synchronization destination arranged to receive a packet including said path identifier and forward said packet along the return path corresponding to the identified path.

12. A method of providing clock synchronization in a packet-based network having as components nodes and links therebetween and having a network topology, the method comprising:
computing, from the network topology, a reciprocal clock synchronization packet path from a server to a synchronization destination according to a computation rule such that a return path of the reciprocal clock synchronization packet path from the synchronization destination is the same as a forward path of the reciprocal clock synchronization packet path;
computing, from the network topology, a diverse reciprocal clock synchronization packet path, from the server to the synchronization destination, comprising a diverse forward path and a diverse return path, wherein no network component other than path end points is in both the reciprocal clock synchronization packet path and the diverse reciprocal clock synchronization packet path;
injecting a first time synchronization packet into the reciprocal clock synchronization packet path;
injecting a second time synchronization packet into the diverse reciprocal clock synchronization packet path;
synchronizing time at the synchronization destination with time at the server based on the first time synchronization packet and the second time synchronization packet;
wherein the method is performed by one or more computing devices.

13. The method of claim 12, further comprising computing, from the network topology, a forward clock synchronization packet path to the synchronization destination according to a link-state algorithm.

14. The method of claim 12, further comprising detecting failure of a path component of one of roundtrip paths and computing at least one further diverse roundtrip path excluding the failed component.

15. The method of claim 14, further comprising forwarding a synchronization packet on the at least one further diverse roundtrip path and withdrawing the roundtrip path including the failed component.

16. A non-transitory computer readable storage medium storing one or more sequences of instructions which, when executed by one or more processors, cause the one or more processors to perform:
computing, from a network topology, a reciprocal clock synchronization packet path from a server to a synchronization destination according to a computation rule such that a return path of the reciprocal clock synchronization packet path from the synchronization destination is the same as a forward path of the reciprocal clock synchronization packet path;
computing, from the network topology, a diverse reciprocal clock synchronization packet path, from the server to the synchronization destination, comprising a diverse forward path and a diverse return path, wherein no network component other than path end points is in both the reciprocal clock synchronization packet path and the diverse reciprocal clock synchronization packet path;
injecting a first time synchronization packet into the reciprocal clock synchronization packet path;
injecting a second time synchronization packet into the diverse reciprocal clock synchronization packet path;
synchronizing time at the synchronization destination with time at the server based on the first time synchronization packet and the second time synchronization packet.

17. The non-transitory computer readable storage medium of claim 16, further comprising additional instructions which when executed cause: computing, from the network topology, a forward clock synchronization packet path to the synchronization destination according to a link-state algorithm.

18. The non-transitory computer readable storage medium of claim 16, comprising additional instructions which when executed cause: detecting failure of a path component of one of roundtrip paths and computing at least one further diverse roundtrip path excluding the failed component.

19. The non-transitory computer readable storage medium of claim 16, comprising additional instructions which when executed cause: forwarding a synchronization packet on the at least one further diverse roundtrip path and withdrawing the roundtrip path including a failed component.

20. A non-transitory computer-readable storage medium according to claim 16, comprising additional instructions which when executed, cause selecting, for an asymmetric link, a forward cost and a return cost, wherein the forward cost is equal to the return cost.

21. A non-transitory computer-readable storage medium according to claim 16, wherein the computation rule comprises, for a path split, a consistent path selection rule.

22. A non-transitory computer-readable storage medium according to claim 16, comprising additional instructions which when executed, cause computing the forward path and the return path rooted at the synchronization destination.

\* \* \* \* \*